United States Patent [19]

McKenzie

[11] 4,138,021
[45] Feb. 6, 1979

[54] DUCTED MATERIAL HANDLING DEVICE FOR TOP UNLOADING OF A STORAGE RECEPTACLE

[75] Inventor: Bruce A. McKenzie, Lafayette, Ind.
[73] Assignee: Purdue Research Foundation, West Lafayette, Ind.
[21] Appl. No.: 818,299
[22] Filed: Jul. 25, 1977
[51] Int. Cl.² .................. B65G 65/32; B65G 65/34
[52] U.S. Cl. .................. 214/17 C; 193/12; 193/27; 222/482; 222/488; 222/564
[58] Field of Search .................. 214/16 R, 17 R, 17 C; 193/12, 13, 27, 28; 222/478, 481, 482, 488, 547, 564

[56] References Cited
U.S. PATENT DOCUMENTS

| | | | |
|---|---|---|---|
| 1,234,710 | 7/1917 | Adams | 214/17 R |
| 2,907,501 | 10/1959 | Laird | 222/564 X |
| 3,278,054 | 10/1966 | Stott | 214/17 C |

Primary Examiner—Robert G. Sheridan
Attorney, Agent, or Firm—John R. Nesbitt

[57] ABSTRACT

A material handling device is disclosed for use in a material holding, or storage, receptacle. The device includes a vertically positioned discharge duct having spaced apertures therein with the bottom of the duct connected to a discharge access passage whereby granular, free flowing material, such as grain, within the receptacle, is withdrawn through the apertures and discharge duct in a manner such that the withdrawn material is from the top of the stored mass. The apertures are either staggered or opposed with respect to one another along the discharge duct. Material loading is through the top of the receptacle with the loading duct, or channel, being formed in a manner so as to prevent damage by impact to the material being introduced.

25 Claims, 6 Drawing Figures

DUCTED MATERIAL HANDLING DEVICE FOR TOP UNLOADING OF A STORAGE RECEPTACLE

FIELD OF THE INVENTION

This invention relates to a material handling devide and, more particularly, relates to a device within a receptacle for handling granular free flowing material to be loaded into and withdrawn from the receptacle.

BACKGROUND OF THE INVENTION

It is oftentimes desirable, or necessary, to load material into a holding receptacle and then later remove the stored material from the receptacle.

While this is not a difficult problem with some materials, such as liquids, or even with some solid state materials, problems have arisen where the material to be handled and stored is a material that is subject to damage by impact during handling. Such a material, for example, could be any granular or pelleted material including grain, seeds and nuts and/or could be chemicals or the like that might be damaged by impact during handling.

In handling of grains, a grain ladder has heretofore been utilized to introduce grain into a storage receptacle, with withdrawal of the grain being commonly from the bottom of the receptacle.

The grain ladder is a device designed to slow the descent of grain (or seeds or other granular of free-flowing materials) into the storage receptacle (or processing, conditioning or holding chamber or vessel). Such a ladder typically consists of one or more rectangular (or square) tubes, or passages, that are vertically positioned and attached to the walls of the receptacle for support with the passages generally being positioned out of the primary grain flow path when the receptacle is unloaded by withdrawal of stored material through an outlet in, or near, the base of the receptacle.

The grain or material ladder derives its name from the fact that the passage into which the material is introduced for flow downward into the storage, or holding, receptacle is equipped with a series of internal baffles to retard the flow and maintain descent velocity below that critical for damage as the grain, seed or material impacts on the mass accumulated in the receptacle. The baffles usually project alternately from two opposite inside surfaces of the ladder passage, and are spaced at alternate points along the passage length. The resultant flow path forms a zig-zag pattern, and the continual change in flow direction as the material descends slows the flow velocity. Such a ladder is normally equipped with outlet ports, which are cut out of the tube wall at points between the locations or elevations of the baffles.

In operation, material descends slowly down the zig-zag ladder inside the ladder passage until it reaches the level of that accumulated in the storage receptacle. At this point, the ladder tube outlet is blocked by accumulated material, and the tube starts to fill. With outlet ports spaced at frequent intervals, the passage fills only to the level of the next higher outlet, resulting in a very short drop onto the accumulated material mass in the storage receptacle.

Grain and material ladders, as now known and normally used, are positioned along the wall of the storage receptacle for support, and to insure that they will be out of the primary grain flow path when the storage is unloaded. The purpose is to minimize the frictional drag on the outside surface of the ladder, which may bring about structural distortion or complete failure and collapse of the ladder assembly as the material flows around and along the tube, or passage, during unloading. Such collapse may also damage the storage structure or associated handling equipment.

Positioning of the grain or material ladder on one or more inside walls of the storage, or holding, receptacle requires that the wall of the receptacle be capable of sustaining of the unbalanced sidewall loading due to the angle of repose of the material. For most free-flowing grains and seeds, this angle of repose is typically 25° to 30° above horizontal. This will result in roughly a 15 foot fill height on the inside of the storage receptacle at the grain ladder for a 30 foot wide structure. This unbalanced loading may cause the wall of the storage receptacle to distort and possibly cause total structural failure by collapse or tipping.

Since many grains, seeds and nuts and a number of free-flowing materials are stored in thin wall structures and vessels that require uniform sidewall loading essentially at all times for structural stability, such side mounted grain or material ladders or flow retarders now known cannot be used.

SUMMARY OF THE INVENTION

This invention provides an improved material handling device useful for loading and unloading granular, free flowing materials into and out of a storage, or holding, receptacle. The device is suitable for use in thin wall storage receptacles requiring uniform sidewall loading for structural stability.

It is therefore an object of this invention to provide an improved material handling device.

It is another object of this invention to provide an improved material handling device useful for loading and unloading storage receptacles.

It is still another object of this invention to provide an improved material handling device useful for handling granular free flowing materials.

It is yet another object of this invention to provide an improved material handling device that enables unloading or withdrawal of material from the top surface of the mass of material within the receptacle on a controlled inflow basis to a bottom located outlet.

It is still another object of this invention to provide an improved material handling device that provides for contiguous loading and unloading paths within a receptacle.

It is still another object of this invention to provide an improved material handling device that includes a vertically positioned discharge passage having apertures therein for withdrawing material from the receptacle.

It is yet another object of this invention to provide an improved material handling device that includes a vertically positioned inlet passage and one or more vertically positioned contiguous outlet passages for loading and unloading of material.

It is yet another object of this invention to provide an improved handling device having a spiral channel for loading material into a receptacle.

It is still another object of this invention to provide an improved material handling device having a spiral channel surrounding a vertically positioned discharge passage with apertures therein.

It is yet another object of this invention to provide an improved material handling device having a spiral channel within a second passage surrounding a vertically positioned discharge passage with both passages having apertures therein that are aligned downward at an angle slightly greater than the angle of repose.

With these and other objects in view, which will become apparent to one skilled in the art as the description proceeds, this invention resides in the novel construction, combination, and arrangement of parts substantially as hereinafter described, and more particularly defined by the appended claims, it being understood that such changes in the precise embodiment of the hereindisclosed invention are meant to be included as come within the scope of the claims.

BRIEF DESCRIPTION OF THE DRAWINGS

The accompanying drawings illustrate three complete embodiments of the invention according to the best mode so far devised for the practical application of the principals thereof, and in which.

DESCRIPTION OF THE INVENTION

Figure 2:
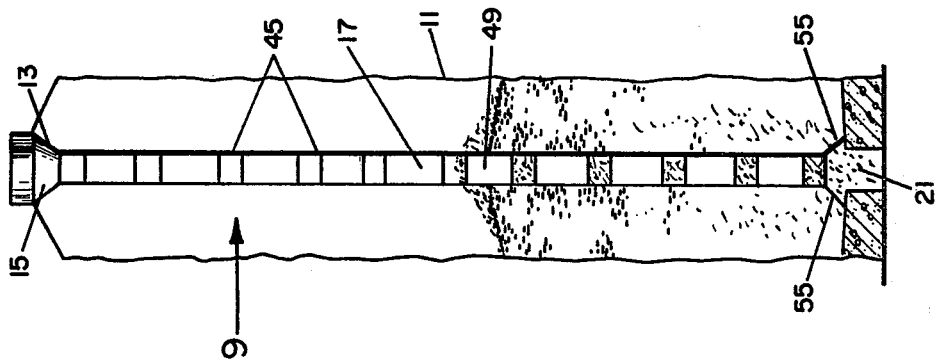
FIG. 2 is a cutaway partial side view of a storage receptacle with the handling device of this invention mounted therein as shown in FIG. 1 but rotated 90° with respect thereto.

Referring now to the drawings, the numeral 9 refers to the handling device of this invention (as shown in FIGS. 1 through 4) mounted within a holding, or storage, receptacle 11.

Figure 1:
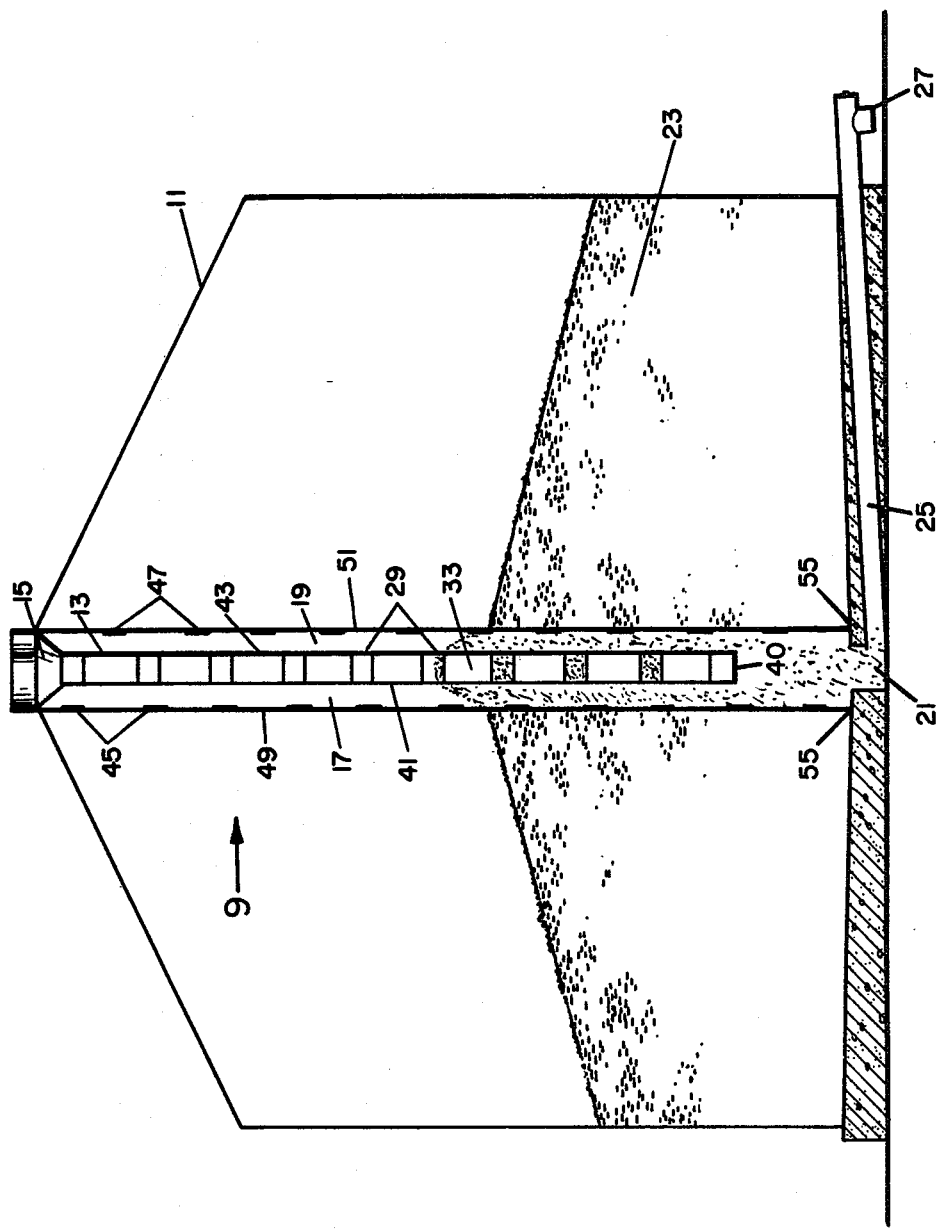
FIG. 1 is a cutaway side view of a storage receptacle showing the handling device of this invention mounted therein.

As shown best in FIG. 1, a material, or grain ladder 13 is mounted in receptacle 11 with an inlet access passage 15 communicating therewith at the top of the receptacle. One or more discharge passages, or ducts (numbered 17 and 19 as shown in FIG. 1) are contiguous to the ladder 13 with an outlet access passage 21 communicating with the discharge ducts at the bottom of receptacle 11. The entire unit is thus anchored at top and bottom.

By this arrangement, material 23 is fed into the receptacle by gravity feed at the top of the receptacle and material is removed from the receptacle at the bottom thereof. In this invention, however, the design and orientation of the discharge ducts is such that the material flow is off of the top surface of the stored mass even though the material is withdrawn at the bottom of the receptacle.

As also indicated in FIG. 1, a conventional conveyor mechanism 25 may be utilized to convey the withdrawn material to a material discharge chute 27 exteriorly of the receptacle. The bottom connector and support to the floor can be designed for use of a modified sweep unloader in a flat bottom receptacle, or for the temporary removal of the bottom connector and support for conventional use of a sweep unloader.

Ladder 13 may be conventional and is an elongated passage, or duct, of preferably a rectangular or square cross-section and having a series of spaced apertures 29 and 31 therein. As shown best in FIG. 3, the apertures in the inlet passage, as utilized in this invention, may be alternated at two opposite sides 33 and 35 of the passage along the length thereof. In other words, each aperture 29 in wall 33 may be longitudinally spaced both with respect to the other apertures 29 in wall 33 and from the apertures 31 in wall 35, as is also true for the apertures 31 in wall 35. The positioning and contour of the apertures may, however, be selected as desired for a particular application.

As indicated hereinabove, ladder 13 preferably includes a series of baffles, or deflectors 37 and 39 alternately mounted in walls 33 and 35, respectively, above the apertures 29 and 31, respectively, in the walls. This causes material introduced into the receptacle to follow a zig-zag path in dropping, under the force of gravity, into the receptacle through the inlet passage (i.e., ladder 13). The bottom end 40 of ladder 13 is preferably closed and terminates in the lower portion of the receptacle but above the bottom of the receptacle as shown in FIG. 1.

In this invention, one or more discharge passages, or outlet ducts 17 and 19 are mounted on the unported opposite sidewalls 41 and 43 of ladder 13, respectively. As indicated in FIG. 1, where two ducts 17 and 19 are utilized, both open to discharge access passage 21.

Figure 3:
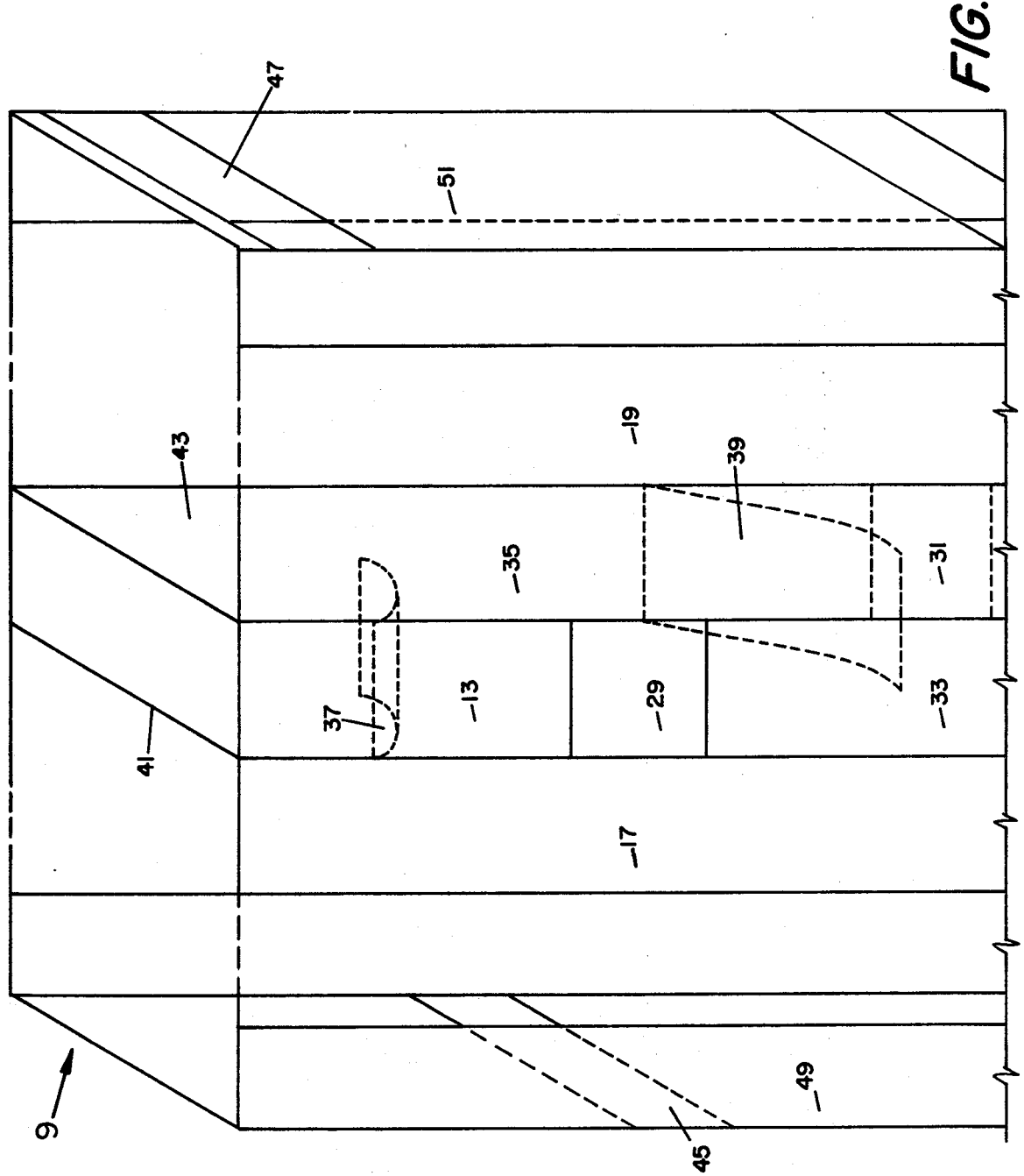
FIG. 3 is a perspective view of a partial section of the handling device as shown in FIG. 1.

Discharge ducts 17 and 19 are preferably of rectangular, or square cross-section and have apertures 45 and 47 therein, respectively, which apertures are preferably on the sidewalls 49 and 51, respectively, opposite to the sidewall contiguous to the inlet passage 13. As indicated in FIG. 3, the apertures, or ports 45 and 47 in the sidewalls 49 and 51 may be alternated from duct to duct, but may, however, be positioned and contoured as desired for a particular application.

Figure 4:
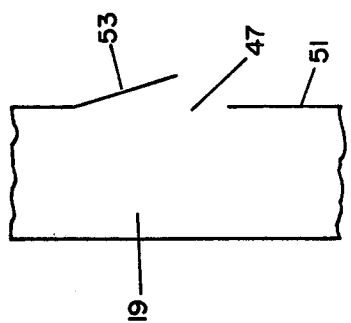
FIG. 4 is a partial side view of the outer walls of the outer duct illustrating use of a hood above the apertures therein as an alternate embodiment.

As indicated in an alternate embodiment in FIG. 4, the apertures 45 and 47 may have a hood 53 thereabove formed by outwardly and downwardly flaring the sidewall immediately above each aperture, or port. Such a hood increases the effects of forces acting in the material (such as grain) conducted past the exposed but submerged port below the upper-most submerged port when all inflow of material is intended to accomplish top unloading of the material.

As indicated in FIGS. 1 and 2, the area of connection of the bottom of the outlet ducts 17 and 19 to the outlet access passage 21, as at 55. This connection may be flared where a hopper is utilized. Such a flare may be necessary, for example, where a hopper is utilized to add a force component to the descending material being unloaded and thus reduce the increased lateral pressure of the material trying to inflow off of a sloped floor, or bottom. The clearance between the bottom of the inlet passage and the bottom of the receptacle should be adjusted to minimize inflow forces on a sloped receptacle bottom, but still bring about complete removal of stored material when directed flow has ceased.

In operation utilizing a unit having a grain, or material, ladder 13 and two discharge ducts 17 and 19, the unit is installed in the center of a receptacle such as a grain, seed, nut or other free-flowing material storage or vessel (a plurality of units in the central portion may also be utilized in lieu of one centrally positioned unit). The material to be placed in storage is conveyed or otherwise delivered into the top of the ladder through inlet passage 15, which is positioned in the center of the assembly. The material descends downward (through the zig-zag path of the material ladder due to the flow retarders) exiting at the port just above the level of accumulated material. With the storage unloading outlet, or passage 21 closed or stopped, no outflow takes place from the unloading ducts 17 and 19. Thus, the ducts simply fill with material as the storage depth accumulates.

When the filled (or partially filled) storage is to be unloaded, the unloading outlet 21 is opened or activated by commercially available devices. The material in the unloading ducts flows downward under the force of gravity and out of the receptacle. As flow is initiated in the unloading ducts, the stored material from the storage surface inflows through the upper-most inlet port, or aperture, that is submerged or partially exposed in the material mass.

Inflow will occur only at the upper-most one or two submerged or partially exposed inlet ports, because these are the only ports in the unload duct exposed to an unfilled or only partially filled unload duct. With a full duct of material being conducted down each side of the grain, or material, ladder, the forces acting in the flowing stream in the duct, when passing a submerged inlet port, will be greater than the forces in the stored mass across the face of the exposed port, that act to bring about inflow into the duct.

Thus, unloading inflow from the storage receptacle will be substantially entirely from the top. With essentially all vertical flow of grain from the structure occurring within the unload ducts, no drag due to flow friction along the outside surface of the assembly need be considered in its design. The only vertical forces placed on the external surfaces of the assembly will be those friction forces associated with grain settling due to drying or storage conditioning.

The entire unit, including the material ladder and unloading ducts, may typically be fabricated from formed and welded sheet metal. The ducts 17 and 19 will be formed to mate with the non-ported walls 41 and 43 and welded or bolted in place. The finished shape of the entire total unit, or assembly, is planned to bring about the greatest possible structural stability compatible with economical fabrication and installation of the finished unit.

In addition to the functional and structural advantages afforded, the unit of this invention enhances the human safety in storage unloading. The danger of suffocation by being drawn into a flowing grain or material stream is substantially eliminated in this design for duct unloading from a ladder assembly (assuming the unloading ducts and inlet ports are too small to permit entry of a human body).

Figure 5:
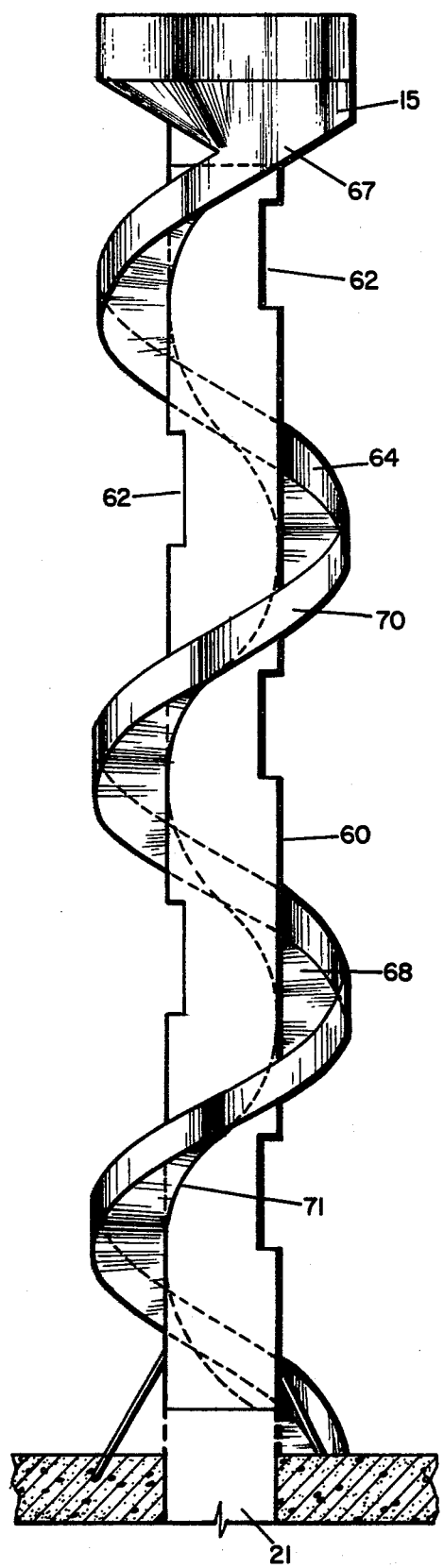
FIG. 5 is a side view of an alternate embodiment of the handling device of this invention with a spiral channel for loading.
Figure 6:
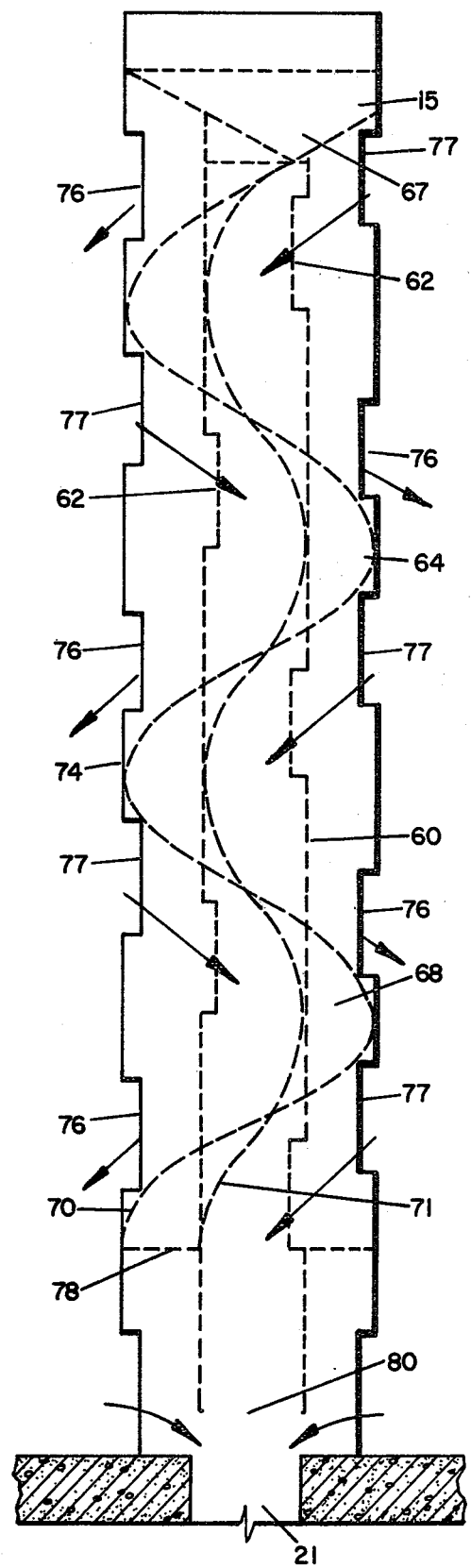
FIG. 6 is a side view of another alternate embodiment of the handling device of this invention with a spiral channel for loading enclosed in an outer duct.

Alternate embodiments of the handling device of this invention are shown in FIGS. 5 and 6. In FIG. 5, a center mounted outlet passage, or duct, 60 is shown anchored at opposite ends to tubular inlet access passage 15 and outlet access passage 21. As shown in FIG. 1, the inlet and outlet access passages are, in turn, anchored at the top and bottom walls of the storage receptacle 11.

Center unloading duct 60 serves both as structural support for the unit and as the outlet passage for conveying the stored material from the receptacle with top unloading again occurring as described hereinabove with respect to the embodiment of the invention as shown in FIGS. 1 through 4. While not shown, a plurality of units could be used spaced within the receptacle (rather than utilizing a single center mounted unit).

Apertures, or ports, 62 are provided in duct 60 in the same manner as described in connection with apertures 45 and 47 in discharge passages 17 and 19 to enable top unloading in the same manner as previously discussed and indicated. The apertures are cut into the tubular duct and, as shown in FIGS. 5 and 6, are spaced along the length of the duct and preferably alternated from side to side, as shown. The spacing and contour may be modified, as desired, for particular utilization so as to bring about reasonably uniform unloading from the upper grain surface.

As shown in FIG. 5, a spiral channel 64 is mounted on and wrapped about center duct 60. The upper end 66 of the spiral channel is connected to the bottom of the inlet access 15 (which access may be modified at bottom portion 67 to connect to the spiral channel) so that material loaded into the inlet access hopper is conducted downwardly along the spiral path (due to the force of gravity) which provides a controlled descent to reduce impact damage to material on contact with other material in the receptacle or the receptacle walls or bottom. The material will, of course, be conducted downwardly to the upper level of the stored material at the spiral path. Spiral channel 64 is preferably a U-shapped channel having bottom wall 68 and sidewalls 70 and 71.

As indicated in the embodiment shown in FIG. 6, the spiral channel 64 may be enclosed in an outer duct 74 which surrounds center duct 60. Spiral channel 64 is positioned between the inner and outer ducts and material to be stored is conducted downwardly along the path in the same manner as described in connection with the embodiment shown in FIG. 5. The amount of inclination of the spiral path determines, of course, the speed of descent of the material.

Outer duct 74 has a plurality of apertures, or ports, 76 and 77 therein which are alternated along the outer duct. Material loading into the storage receptacle is accomplished by material leaving the spiral path and passing through port 76 at or just above the level of the material in the storage receptacle.

Each port 77 is aligned with a port 62 in the inner duct 60 at an angle slightly above the static angle of repose for the material to be handled. As indicated in FIG. 6, the access of each associated pair of aligned apertures 77 and 62 is preferably inwardliy and downwardly directed. As material is withdrawn below the open bottom end 80 of the unload center duct 60, material inflows into the upper-most inlet port 76 exposed to grain pressure. Successive inlet ports in-flow as the material level recedes as unloading proceeds. The inlet apertures, or ports 77 and 62 are preferably positioned spirally around the outer duct 74 and inner duct 60, respectively, so as to bring about a reasonably uniform unloading from the stored material surface. The spacing and configuration of the apertures can, however, be selected as desired for a particular utilization.

When utilizing outer duct 74, the outer duct is preferably closed at the lower portion (but above the outlet access 21) by horizontal wall 78. Wall 78 is preferably positioned just below the lowest outlet port 76 and slightly below the lower terminal point of the spiral channel to accumulate a small pocket or quantity of stored material to further help cushion the material descent just before discharge from the adjacent outlet port.

As also shown in FIG. 6, the bottom end 80 of the unload duct 60 is positioned just above the outlet access 21 to permit material in-flow in the final quantity flow from the stored material surface. As an alternative, the lower end of duct 60 could be placed tightly over the outlet access, with provision for a manual opening of inlet ports into the unload duct immediately above the bottom of the storage receptacle, at one or more points around the duct. The discharge of material from the storage receptacle is, of course, blocked during filling, or loading, of material into the storage receptacle.

The device, or unit of this invention, can be utilized for handling of all granular or pelleted or natural material subject to damage from impact during handling into and out of a storage, vessel, or container for holding or transport.

The materials and grain are intended to include all grains and seeds plus nuts. The materials considered include such examples as pellets, both feed and plastic or raw materials; animal feed materials in granular or pellet for livestock, poultry, pets and fish or birds; human food such as cereals, and bulk handled produce items such as fruits and vegetables. Snack foods and similar granular or pelleted food items are also considered.

The device can be utilized for any storage, vessel, or container whether on land, sea, water, or air. It is applicable to processes concerned with all manner of business, including agriculture, food processing, milling, food packaging, industrial manufacturing, and materials handling in all aspects of production, processing, transportation, marketing, conditioning, and distribution of grains and materials subject to impact damage in handling. In addition, the device can also be utilized in handling of chemical materials involving forms subject to undesirable shattering in impact.

As can be appreciated from the foregoing, this invention provides an improved device for handling granular free flowing materials, and more particularly, in loading materials into a receptacle and unloading the same therefrom.

What is claimed is:

1. A material handling device for use in a material holding receptacle, said device comprising:
an inlet passage positionable within a holding receptacle for loading flowable materials into said receptacle, said inlet passage having apertures therein opening into said receptacle;
wall means defining a discharge passage positionable within said holding receptacle contiguous to and extending at least partially along said inlet passage, said wall means having a plurality of spaced apertures therein opening said passage to said receptacle when within said receptacle and through which flowable materials stored in said receptacle may pass into said discharge passage, said apertures in said wall means being oriented so that said apertures are at different heights with material flow being substantially only from the highest of said apertures having flowable materials thereat when material is withdrawn through said discharge passage;
positioning means for positioning said discharge passage within said holding receptacle so that material in said receptacle is contiguous to at least a portion of said wall means having said apertures therein; and
discharge means communicating with said discharge passage and through which material is withdrawn from said discharge passage resulting in additional material in said receptacle being drawn into said discharge passage substantially only through said higher one of said apertures so long as said material is contiguous to a said higher one of said apertures.

2. The material handling device of claim 1 wherein said wall means is positioned by said positioning means so that said discharge passage extends in a substantially vertical direction, and wherein said discharge means communicates with the lower portion of said passage.

3. The material handling device of claim 1 wherein said inlet passage and said discharge passage includes elongated passages with at least said discharge passage being positioned to extend in a substantially vertical direction and substantial portions of said passages being contiguous to one another.

4. The material handling device of claim 3 wherein said flowable material is a material subject to damage by impact during handling such as grain and wherein said device includes means to protect against damage to said material by impact during handling of said material.

5. A material handling device for use in a material holding receptacle, said device comprising:
a vertical inlet passage positionable within a holding receptacle for loading flowable material into said receptacle, said inlet passage having first and second side portions with said second side portion having apertures therein opening into said receptacle;
wall means defining a vertical discharge passage contiguous to and extending along said first side portion of said inlet passage, said wall means having a plurality of spaced apertures therein opening said passage to said receptacle when within said receptacle and through which flowable materials stored in said receptacle may pass into said discharge passage;
positioning means for positioning said discharge passage within said holding receptacle so that material in said receptacle is contiguous to at least a portion of said wall means having said apertures therein with at least one of said apertures in said wall means being higher than at least another of said apertures; and
discharge means communicating with said discharge passage and through which material is withdrawn from said discharge passage resulting in additional material in said receptacle being drawn into said discharge passage substantially only through a higher one of said apertures so long as said material is contiguous to a said higher one of said apertures.

6. The material handling device of claim 5 wherein material is introduced into the top of said inlet passage; wherein said inlet passage has deflector means therein to slow material flow downward through said inlet passage with said material being introduced into said receptacle through said apertures in said passage until blocked by material accumulated in said receptacle; wherein material is discharged from the bottom of said device through said discharge means; and wherein the bottom of said discharge passage communicates with said discharge means.

7. The material handling device of claim 6 wherein said inlet passage is of rectangular cross-section with said apertures therein on one pair of opposite sides, and wherein said outlet passage includes a pair of rectangular passages contiguous to the other pair of opposite sides of said inlet passage, said apertures being at the side opposite to that contiguous to said inlet passage.

8. A material handling device for use in a material holding receptacle, said device comprising:
- means defining a spiral inlet path for loading flowable material into said receptacle;
- wall means defining a vertical discharge passage having said spiral inlet path wrapped therearound over a substantial length of said discharge passage, said wall means having a plurality of spaced apertures therein opening said passage to said receptacle when within said receptacle and through which flowable materials stored in said receptacle may pass into said discharge passage;
- positioning means for positioning said discharge passage within said holding receptacle so that material in said receptacle is contiguous to at least a portion of said wall means having said apertures therein with at least one of said apertures in said wall means being higher than at least another of said apertures; and
- discharge means communicating with said discharge passage and through which material is withdrawn from said discharge passage resulting in additional material in said receptacle being drawn into said discharge passage substantially only through a higher one of said apertures so long as said material is contiguous to a said higher one of said apertures.

9. The material handling device of claim 8 wherein said spiral path is positioned along said discharge passage so as to be spaced from said apertures in said discharge passage.

10. The material handling device of claim 8 wherein said spiral path is opened to said receptacle when within the same.

11. The material handling device of claim 8 wherein duct means are provided adjacent to said discharge passage, said spiral path being within said duct means.

12. The material handling device of claim 11 wherein said duct means has apertures therein at the side thereof substantially opposite to that contiguous to said discharge passage whereby material in said receptacle can be unloaded by passing through said apertures in said duct means and said apertures in said discharge passage, said apertures being aligned with the axis of each pair thereof so aligned extending downwardly and inwardly.

13. A material handling device for internal use in loading and unloading a storage receptacle, said device comprising:
- material loading means extending downwardly from the top of a storage receptacle for loading of material into said receptacle through the top thereof;
- material unloading means including a substantially vertically positioned discharge passage contiguous to said material loading means, said discharge passage having spaced apertures therein through which material loaded into said receptacle can be removed therefrom by gravity flow with said material being constrained to passing into said apertures in a manner such that the flow of said material is from the top; and
- means for positioning said loading and unloading means substantially at the central portion of said receptacle.

14. The material handling device of claim 13 wherein said material loading means includes means for retarding the flow of material into said receptacle, and wherein said material unloading means including means connected with said discharge passage at the bottom of said receptacle for carrying unloaded material from the receptacle.

15. The material handling device of claim 13 wherein said material loading means and said material unloading means are interconnected to provide the framework for said device substantially at the central portion of said receptacle.

16. A handling device for loading and unloading granular, free flowing material into and out of a storage receptacle, said device comprising:
- an elongated inlet duct having spaced apertures at first opposite sides and second opposite sides laterally spaced from said first opposite sides;
- an inlet access passage mountable at the top of a storage receptacle for enabling material to be stored to be introduced into said inlet duct;
- a pair of elongated outlet ducts each of which has a first side that is contiguous to a different one of said opposite sides of said inlet duct, each of said outlet ducts having a second side with apertures therein; and
- an outlet access passage mountable at the bottom of a storage receptacle for enabling stored material to be withdrawn through said outlet ducts.

17. The handling device of claim 16 wherein said apertures in said inlet duct are longitudinally spaced with respect to one another and alternated on said first opposite sides of said duct, and wherein said inlet duct is closed at the bottom.

18. The handling device of claim 17 wherein said inlet duct extends into the lower portion of said receptacle but terminates at a point above the bottom of said receptacle when so mounted therein.

19. The handling device of claim 17 wherein said inlet duct is a grain ladder having deflectors therein.

20. The handling device of claim 16 wherein said second side of said outlet ducts having said apertues therein are opposite said first side contiguous to said opposite sides of said inlet access.

21. The handling device of claim 16 wherein each of said apertures in said second side of said outlet ducts has an outwardly and downwardly curved hood at the top thereof.

22. A handling device for loading and unloading granular, free flowing material into and out of a storage receptacle, said device comprising:
- an elongated outlet duct having spaced apertures at opposite sides thereof;
- an outlet access passage mountable at the bottom of a storage receptacle for enabling stored material to be withdrawn through said outlet duct;
- a spiral channel wound about said outlet duct, said channel being spaced from said apertures in said outlet duct; and
- an inlet access passage mountable at the top of a storage receptacle for enabling material to be stored to be introduced into said spiral channel.

23. The handling device of claim 22 wherein said device includes means for positioning said outlet duct in the central portion of a receptacle.

24. The handling device of claim 22 wherein said device includes a second duct surrounding said outlet duct and having said spiral channel therein, said second duct having apertures therein.

25. The handling device of claim 24 wherein said apertures in said second duct are aligned with said apertures in said outlet duct with the axes therebetween being downwardly and inwardly directed.

* * * * *